S. S. GRIFFIN.
SLED.
APPLICATION FILED APR. 9, 1917.

1,238,285. Patented Aug. 28, 1917.

Inventor
Sidney S. Griffin
By Shepherd Campbell
his Attorneys

UNITED STATES PATENT OFFICE.

SIDNEY S. GRIFFIN, OF TACOMA, WASHINGTON.

SLED.

1,238,285.  Specification of Letters Patent.  Patented Aug. 28, 1917.

Application filed April 9, 1917. Serial No. 160,799.

*To all whom it may concern:*

Be it known that I, SIDNEY S. GRIFFIN, a citizen of the United States of America, residing at Tacoma, in the county of Pierce and State of Washington, have invented certain new and useful Improvements in Sleds, of which the following is a specification.

This invention relates to sleds and more particularly to dirigible sleds and its object is to provide simple and inexpensive means whereby the occupant of the sled will be enabled to efficiently guide or steer the same by hand.

A further object of the invention is to provide a front truck or sled constructed in such manner that the opposite sides thereof may be shifted to varying positions of angularity with respect to the body of the sled while being maintained in parallelism with each other and at the same time will be securely braced with respect to each other throughout varying positions of adjustment.

Further objects and advantages of the invention will be set forth in the detailed description which now follows:

In the accompanying drawing.

Like numerals designate corresponding parts in all of the figures of the drawing.

Figure 1:
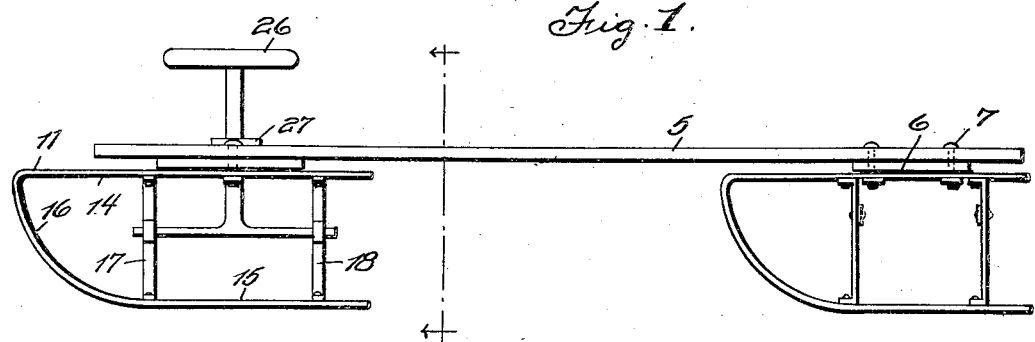
Figure 1 is a side elevation of a sled constructed in accordance with the invention.
Figure 2:
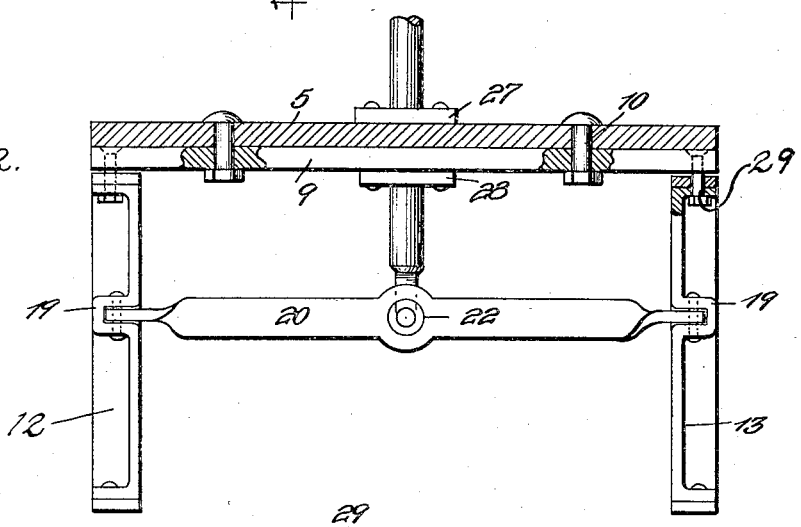
Fig. 2 is a transverse, vertical section upon an enlarged scale and upon line 2—2 of Fig. 2.
Figure 3:
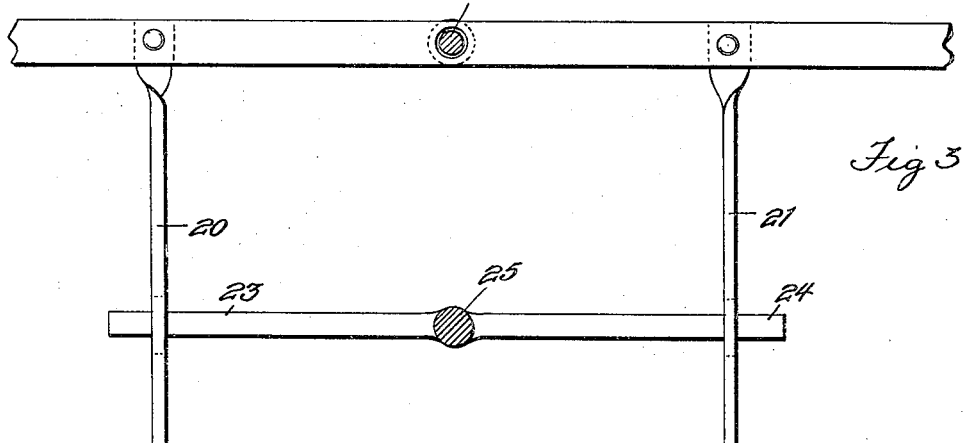
Fig. 3 is an enlarged plan of a part of the front truck of the sled, the body of the sled being removed.

Referring to the drawing, 5 designates the body of the sled, 6 a rear bolster secured to the body by fastening devices 7, and 8 the rear truck, which rear truck is rigidly secured to the bolster 6 by the same fastening devices that secure the bolster 6 to the body 5. A front bolster 9 is secured to the body 5 by bolts 10. The front truck indicated in a general way at 11 comprises runners 12 and 13, each of said runners comprising a top rail 14, a bottom rail 15 and a curved connecting portion 16. Vertical braces 17 and 18 extend between the rails 14 and 15 and these braces between their ends are bent to form U shaped portions 19 within which the opposite ends of cross links 20 and 21 are pivoted. These cross links are centrally pierced at 22 for the reception of the opposite ends 23 and 24 of the horizontal member of a T shaped steering bar, the shank of which is indicated at 25. This steering bar carries a handle 26 and its shank is journaled in bearings 27 and 28 carried by the body 5 and bolster 9 respectively. The top rails 14 of the runners are pivotally connected to the bolster by bolts 29 and it will, therefore, be seen that each of the front runners swings around one of the bolts 29 as a center and that these runners may be actuated to thus swing around said bolts by the manipulation of the hand wheel 26 because the turning of the hand wheel 26 and its shank 25 throws the links 20 and 21 in opposite directions and moves the front runners to varying positions of angularity with respect to the body 5 while at the same time the parallelism of these runners is maintained. Furthermore, the links 20 and 21 extending between the braces of the front runners act themselves as braces to maintain the desired rigidity of the structure as a whole.

It will, therefore, be seen that the present invention comprises very simple and inexpensive means whereby it is possible to steer a sled by hand and with the occupant sitting upright thereon, if desired. It will also be seen that the elements designed to accomplish the foregoing object have been correlated in such a novel manner as to brace and impart the desired rigidity to the front truck.

Having described my invention what I claim is:—

1. A device of the character described comprising a body portion, a truck comprising a pair of runners, each of said runners comprising top and bottom rails and vertical braces, means for pivotally connecting the top rail of each runner at a point intermediate its ends to the body portion, a pair of links extending laterally between said rails and having their opposite ends pivotally connected to the braces of the runners, said links lying upon opposite sides of the pivotal connection of the top rails of the runners with the body portion, a T shaped steering member comprising a vertical shank passing through the body portion and a horizontal lower end, the extremities of which engage said links.

2. A truck or sled comprising a pair of runners, each of said runners comprising top and bottom rails, vertical braces extending between the top and bottom rails, each of said braces having outwardly bent U shaped portions, links extending between the opposite braces of the runners and having their ends pivoted in said U shaped portions and a manually operable member engaging said links.

In testimony whereof I affix my signature in presence of two witnesses.

SIDNEY S. GRIFFIN.

Witnesses:
MABEL PHELPS,
A. A. KNIGHT.